United States Patent [19]

Karp et al.

[11] Patent Number: 5,172,381
[45] Date of Patent: Dec. 15, 1992

[54] ENHANCED DATA FORMATS AND MACHINE OPERATIONS FOR ENABLING ERROR CORRECTION

[75] Inventors: James M. Karp, Tucson, Ariz.; Steven W. Roach, Flower Mound, Tex.; Richard C. Schneider; Stephen C. West, both of Tucson, Ariz.

[73] Assignee: International Business Machines Corporation, Armonk, N.Y.

[21] Appl. No.: 693,118

[22] Filed: Apr. 26, 1991

Related U.S. Application Data

[62] Division of Ser. No. 343,551, Apr. 27, 1989.

[51] Int. Cl.5 .............................................. G06F 11/10
[52] U.S. Cl. ................................... 371/42; 371/40.3; 371/47.1
[58] Field of Search ...................... 371/40.3, 42, 47.1; 360/51, 53, 47, 70

[56] References Cited

U.S. PATENT DOCUMENTS

| | | | |
|---|---|---|---|
| Re. 28,265 | 12/1974 | Irwin ..................................... | 360/48 |
| 3,821,703 | 6/1974 | Devore et al. ..................... | 371/37.1 |
| 4,081,844 | 3/1978 | Devore et al. ........................ | 360/48 |
| 4,404,676 | 9/1983 | DeBenedictis ..................... | 371/47.1 |
| 4,680,766 | 7/1987 | Wilkinson ........................... | 371/47.1 |
| 4,694,473 | 9/1987 | Etoh ..................................... | 371/42 |
| 4,791,643 | 12/1988 | Molstad et al. ..................... | 371/47.1 |

OTHER PUBLICATIONS

Potterson et al. "A Case for Redundant Arrays of Inexpensive Disks (RAID)", 88ACM, Mar. 1988.

*Primary Examiner*—Charles E. Atkinson
*Attorney, Agent, or Firm*—H. F. Somermeyer

[57] ABSTRACT

A record medium, such as a magnetic tape, optical disk, magnetic disk, and the like stores data signals and error redundancy signals. Resynchronization signals are interleaved between the recorded signals such that the error redundancy signals are usable to correct signals recorded between such interposed resynchronization signals wherein no error redundancy signals are recorded. Error pointing redundancy signals are recorded between all of the resynchronization signals for pointing to signals in error for enhancing the error correction. Such error pointing signals can be cyclic redundancy check (CRC) signals. Controls for taking advantage of the above-described arrangement are also described. Reframing and clock synchronization controls are also disclosed.

5 Claims, 5 Drawing Sheets

ENHANCED DATA FORMATS AND MACHINE OPERATIONS FOR ENABLING ERROR CORRECTION

This application is a division of application Ser. No. 07/343,551, filed Apr. 27, 1989.

FIELD OF THE INVENTION

The present invention relates to recording and readback systems of the magnetic or optical type, for example, and more particularly to error controls by a signal recording format and during readback for enabling enhanced error detection and corrections.

BACKGROUND OF THE INVENTION

Integrity of data signals recorded on a record-bearing medium is of utmost importance. Because most record media are prone to defects which induce errors in the recording and readback processes, error detection and correction systems have been employed for many years for maintaining correctness of the readback data. Included in such readback are resynchronization procedures which enable a readback clock which is synchronized to the data signals coming from the record medium to be reset to a referenced timed position such that the data byte boundaries and word boundaries can be faithfully identified. It has been the practice to limit the error detection and correction systems to data signals recorded between such resynchronizing signals recorded o record media. In accordance with the present invention, this limitation has been removed while maintaining faithful signal reproduction including expanded utilization of the error correction functions for signals sensed or read from an error-prone record medium.

DISCUSSION OF THE PRIOR ART

Devore et al., in U.S. Pat. No. 3,821,703, shows multi-track magnetic tape recorder in which resynchronization signals are interposed between data signals of a block of data signals recorded on the tape. Additionally, preamble and postamble synchronization signals occur at the longitudinal extremities of the record block. In the Devore et al. system, the error correction occurred in subgroups of data signals always lying in between adjacent ones of the resynchronization signals; that is, between two adjacent resynchronization signals where a plurality of error detecting and correcting groups of signals, each group having its own individual error redundancy signals for error correction. At one longitudinal end of each data block were appended a cyclic redundancy check (CRC) redundancy which had a different generator polynomial than the error correction system for the subgroups and was used for detecting uncorrected or miscorrected errors in the subgroups. No error correcting capability was provided. The resynchronization and reframing of the clocking controls for the Devore et al. system is shown by the Irwin patent RE28265. Devore et al. in U.S. Pat. No. 4,081,844 shows utilization of the three framing or marker signals in a preamble or postamble of a multi-track magnetic tape recorder. It should be noted that the resynchronization signals used by DeVore et al. and shown in U.S. Pat. No. 3,821,703 includes a marker signal for indicating beginning of data at each extremity of the resynchronization signals.

Molstad et al., in U.S. Pat. No. 4,791,643, show a single-track magnetic tape recorder in which the error correction coding redundancies are run-length limited (RLL) encoded with the data signals for recording on the magnetic tape. Such RLL encoding was also used by Devore et al., in the patent '703. Such RLL encoding produces a constrained recording modulation which facilitates high-density recording with more reliable readback than without such constrained recording modulation code.

Optical storage disks are quite often hard sectored. Such hard sectoring comprises a synchronization burst of signals and a data marking signal embossed into the surface of the record disk. Access to the space between the circumferentially-spaced apart sector signals is by an address embossed in the respective sector signals. Error detection and correction is limited to the signals and the redundancy being entirely stored between circumferentially adjacent ones of such sector signals.

SUMMARY OF THE INVENTION

It is an object of the present invention to enhance the faithful recovery of recorded data by inserting resynchronization signals within an error correcting field.

It is another object of the invention to provide enhanced recorder operation which facilitates error correction across a plurality of resynchronization signals.

In accordance with the invention, transducer means are disposed in operative relationship to a record medium for transferring signals therewith. The data handling unit channels data in a non-record format and is operatively connected to ECC means for transferring signals therewith such that the ECC means can process error detection correction signals with data signals recorded on and read from the record medium for effecting error detection and correction. Interleaving means are operatively connected to the ECC means for transferring signals therewith in groups of signals of predetermined number of data signals each with a predetermined number of error redundancy signals. The groups of signals are logically and error correctingly independent. Error pointing means are operatively connected to the interleaving means for transferring signals therewith and which include a plurality of groups of signals which are interleaved for recording on the record medium. Error pointing signals are processed within each of the segments of signals to be disposed between two or more adjacent resynchronization signals. There is one error pointing signal for each segment of the group of signals which corresponds to a correctable segment by a single error redundancy-generated syndrome signal. Resynchronization signals are interposed between the recorded data signals and error redundancy signals at the boundaries of such error correcting syndrome signals or segments sets of the data signals. The error pointing signals recorded with each of the segments is preferably a cyclic redundancy check having a given generator polynomial. The error correcting means has a generator polynomial different from the CRC or EP (error pointer) generator polynomial.

Error pointers are generated by detecting loss of a failure of a clock synchronization with the recorded data being read back and the actuation of resynchronization upon the detection of such error in the clock recovery. Resynchronization signals are spaced apart a distance greater than the longest expected defect in the media which would result in an extended burst of errors in the recorded signals. In another aspect of the invention, the resynchronization activity is generated only when the clock synchronization to the data is in error.

Operation of the recorders is enhanced by the selection of a run-length limited code which eliminates the all ones data synchronizing burst character as well as an all zeros character such that an all ones and an all zeros byte are outside of the constrained set of symbols used to represent information.

The foregoing and other objects, features, and advantages of the invention will be apparent from the following more particular description of preferred embodiments of the invention, as illustrated in the accompanying drawings.

DETAILED DESCRIPTION

Figure 1:
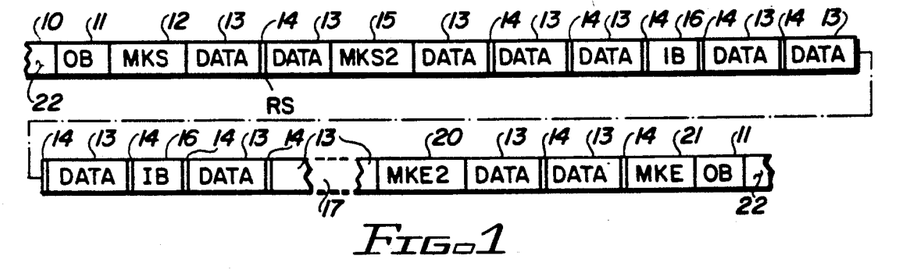
FIG. 1 diagrammatically illustrates a magnetic tape having one track with data signals recorded in accordance with the practice of the present invention.
Figure 2:
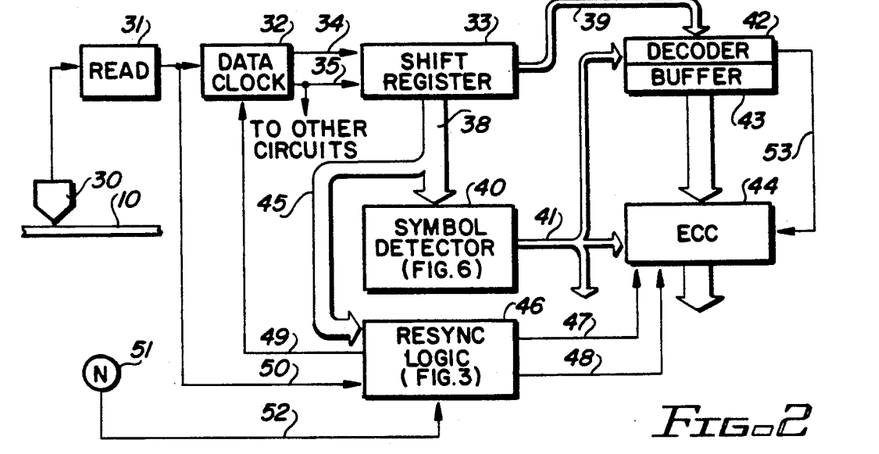
FIG. 2 is a simplified logic diagram of circuits usable to read the signals from the FIG. 1-illustrated magnetic tape and for effecting the practice of invention with the such readback signals.

Referring now more particularly to the appended drawings, like numerals indicate like parts of structural features in the various figures. A portion of a magnetic tape 10 shown in FIG. 1 illustrates a format of a block of data signals recorded in the single track of tape 10. At the left longitudinal end of the illustrated record block (also termed a sector herein), there is a preamble or outer burst signals OB 11. Typically, OB 11 is an all ones pattern for synchronizing a well-known readback data clock 32 (FIG. 2). Data begin mark MKS (mark start data) signal, which includes a long wave length (zeros) for indicating the phase and the location of the first data signal in adjacent data portion 13. Data signals recorded in portion 13 are preferably run-length limited encoded as will become more apparent. The illustrated record block includes a large plurality of data portions 13, each portion storing a fixed number of data signals as will become apparent. Next described control portions separate data portions for increasing reliability of the recording system. Abutting the first data portion 13 is an internal reframing set of signals 14, also termed RS. This pattern is 100010001 where the ones are signal transitions and the zeros are transition positions having no signal transitions. The pattern RS is used in all of the control portions for indicating the phase of the data transitions and their respective locations. All of the control patterns are later described.

In the rare event that MKS is not detected such that the onset of data is not indicated, a second start of data pattern MKS2 is embedded into the data block as MKS2 15. Two data portions 13 and one reframing portion are located between MKS 12 and MKS2 15, no limitation to this arrangement is intended. MKS 12 and MKS2 15 are both unique signal patterns which include the RS pattern. Data is represented in d,k coding which has a limited number of legal or valid signal patterns for representing data, as is well known. The RS pattern 100010001 is a pattern that is not a data representing pattern. In constructing the unique control portion patterns the following byte patterns are established for use in the control portions, each pattern has a label for easy reference.

| LABEL | PATTERN |
|---|---|
| RS | 100010001 |
| R1 | 010001000 |
| R2 | 101000100 |
| R3 | 000101010 |
| R4 | 101000101 |
| R5 | 000100010 |
| R6 | 001000101 |
| R7 | 010101000 |

In the above table, note that the patterns R1 and R5; patterns R2 and R6 and patterns R3 and R7 are symmetrical, respectively. Such symmetry is used for enabling reading the data block in either direction of scanning, left to right or right to left. Patterns RS and R4 are individually symmetrical. Pattern R4 signifies a direction toward the middle of the data block while pattern RS signifies beginning of data as will become apparent. The beginning of data marker MKS has the four bytes R1R2RSR3 while the second or backup data beginning data marker has the four bytes R7RSR1R4. R1 indicates that both patterns are at the beginning of the data block (as measured in a so-called forward direction of tape motion with respect to a transducer), R4 indicates the pattern end which is toward the center of the data block and R7 indicates that it is not the first control pattern. Later-described control portions use the control bytes in different combinations. Other non-used patterns could also be selected rather than the illustrated patterns. Following MKS2 15 are three data portions 13 separated by two reframing portions 14 (each reframing portion has a single byte RS). The next major control portion is IB 16 which consists of a string of binary ones (signal transitions) bracketed by a pair of RS bytes creating the pattern "RS111111...1111RS". This pattern is symmetrical for enabling resynchronization of the data clock in either direction of reading with the RS bytes respectively indicating the onset of data in the forward and reverse directions of tape motions. A plurality of control portions IB 16 are provided in each data block, each of the control portions being separated by a series of data portions 13 and reframing portions 14, as shown. The number of data portions between MKS 12 and the first IB 16, between the IB 16 and between the last IB 16 and the later-described control portion MKE are the same and preferably a fixed number of data portions. The end of the data block is marked by a control portion MKE 21 followed by OB 11 which is the trailing burst of binary one signals for enabling data clock synchronization when reading in the reverse direction, from right to left as seen in FIG. 1. MKE has the bytes R7RSR6R5 which is symmetrical to MKS. Therefore, the initializing patterns in either direction of reading are identical. Control portion MKE2 20 is disposed toward the center of the data block from the control portion MKE 21 by two data portions 13 which are separated by a reframing portion 14. In the event that MKE 21 is not detected while reading in the reverse direction, MKE2 becomes the backup data initializing pattern. The MKE2 pattern R4R5RSR3 is symmetrical to the MKS2 pattern. From the above, it can be seen that data reading can be initiated if one and only one of the four patterns MKS, MKS2, MKE or MKE2 are readable. Later-described error detection and correction enables recovery of the data located between MKES and MSK2 when MKS cannot be read and MKE and MKE2 or between MKE and MKE2 when MKE cannot be read in addition to not reading MKS and MKS2.

FIG. 2 illustrates in simplified form a portion of a recorder in which the control of data readback enhances error detection and correction and reliable readback which uses the internal control portions RS 14 and IB 16 is described. A sensing transducer 30 is in operative position with respect to the record track on magnetic tape 10. Bit indicating signals are supplied through a set of read circuits 31 of known design to supply a set of digital signals representative of the signal sensed by transducer 30. A data detector and clock 32, herein referred to as data clock, receives the digitized signals and detects the data contained in such digitized signals for supply data signals to a shift register 33 via signal line 34. The clocking circuits in the data clock 32 generate a timing signal slaved to the readback signal and which is called a clock. The clock is supplied over line 35 to shift register 33 and to other circuits (as is shown) for synchronously operating same with respect to the data signals on line 34. Shift register 33 has a sufficient number of bit positions to store a complete control portion MKE, MKE2, MKS, MKS2 or IB. Shift register 33 is an open-ended register with the signals shifted out the shift-register end traveling over line 39 to data decoder 42.

Figure 6:
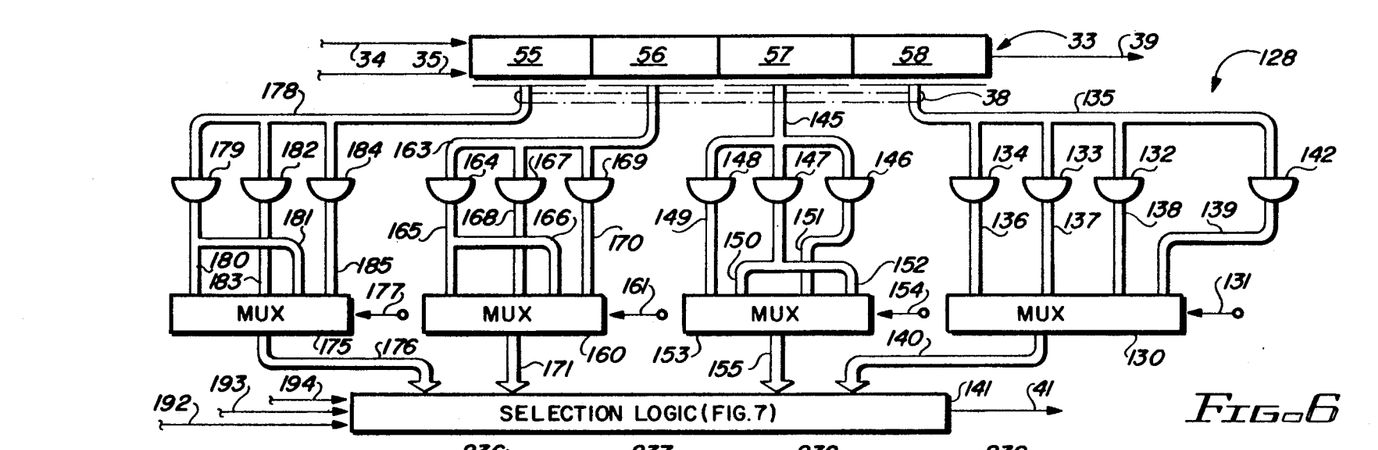
FIG. 6 is a diagrammatic showing of the FIG. 1-utilized symbol detector for indicating beginning of data at a longitudinal extremity of a resynchronization burst or of the inner extremity of a terminal synchronization burst.

A cable or bus 38 extends from shift register 33 to symbol detector 40, also described with respect to FIG. 6. Symbol detector 40 detects the control portion patterns. Line 41 carries a signal from detector 40 signifying that an expected control portion pattern has been detected and the next data signal coming is arriving as an RLL code group to be decoded by decoder 42 and stored in at a predetermined storage location in buffer 43. The operation of RLL decoders 42 and signal buffers and recorders is well known and not described for that reason. Additionally, a cable or bus 45, extending from cable 38, carries predetermined signals as will become apparent to resync logic circuits 46 which analyze the synchronization of clock 32 to the data being read and for reestablishing synchronization by responding to a control portion IB. Line 47, extending from resync logic 46, carries a signal indicating that a control pattern has been detected and alerts the other circuit portions of the playback system that a clock synchronization is to occur. As will become apparent, clock synchronization occurs only when the data clock 32 has lost synchronization with the data being read. This signal travels to ECC circuits 44 as well as to other circuit portions, including decoder 42. Line 48 also extending from resync logic 46 carries an end-of-burst signal to ECC circuits 44 which is in time coincident with the signal on line 41, for example. A line 48 signal also extends to buffer 43 for assuring correct addressing and to decoder 42 for providing timed control of decoding RLL groups. Line 49 also extending from resync logic 46 carries a frequency error indicating signal signifying that the data clock 32 is no longer in phase or frequency synchronization with readback signals. The line 49 signal disables the data clock 32 from detecting any additional data signals, therefore, no data signals are supplied over line 34 to shift register 33 nor to decoder 42. Data clock 32 continues to emit clock signals over line 35 for maintaining circuit operations until synchronization with the data is reestablished. This action, in effect, dead tracks the signal track of tape 10, i.e., dead tracking means that no data signals are being supplied from the detector because of the clocking error situation. Clock resynchronization is known. The signals from read circuits 31 not only travel to data clock 32 but are supplied over line 50 to resync logic 46, later described with respect to FIG. 3. In addition, a crystal-controlled oscillator 51 operates at a much higher frequency than the data frequency used to record signals on tape 10. This high-frequency signal travels over line 52 for timing the operation of resync logic 46 as will become apparent. Line 53 extends from decoder 42 to ECC 44 for supplying an error pointing signal indicating that a decoded RLL group has violated the constrained set of symbols and therefore is in error. Such signal is an error pointer usable by ECC 44 for correcting errors as is known.

Figure 3:
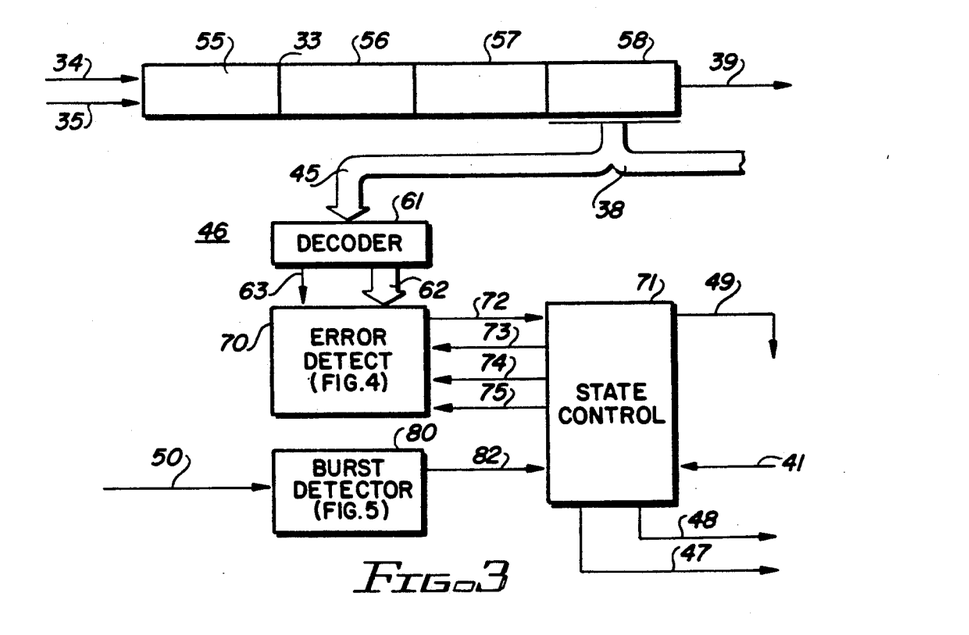
FIG. 3 is a simplified showing of the resync logic portion of FIG. 2.

Shift register 33 operation and construction is best seen in FIG. 3. Shift register 33 has four single-byte portions 55–58 which serially receive the readback signals from line 34 and shifts same through the shift register in synchronism with the line 35 clock signal as an open-ended shift register, i.e., the data signals leaving single-byte portion 58 then travel over line 39. When shift register 33 is filled with signals whether resynchronization bursts, or control symbols, or symbols within the constrained set of RLL data representing signals, the first received byte is in portion 58, the second received byte is in portion 57, the third received byte is in portion 56 and the fourth and last received byte is in portion 55. The timing of the circuit is such that the byte boundaries could be identified by the above-referred to data mark portion of the resynchronization signals and the terminal synchronizing signal portions. When data clock synchronization is to be established, then the next described circuits respond to all or selected ones of the shift register 33 signals to indicate control portion. Typically, the data mark signal is a relatively long wavelength, i.e., a plurality of consecutive zeros such as in RS.

Logic 46 (FIG. 3) includes a run-length symbol decoder 61 which receives all of the first byte signals from portion 58 over bus 45 for detecting illegal combinations of the constrained set data-representing symbols. In practice, decoder 61 can be decoder 42 of FIG. 2. When an RLL symbol error is detected, an error pointer is supplied over line 63 to error detection circuit 70, which is detailed later with respect to FIG. 4. Additionally, bus 62 carries bit-parallel symbol signals for use by error detection circuit 70, as will become apparent. The end of the IB burst signal is supplied burst detector 80 over line 82 to state control 71, then to line 48 of FIG. 2.

This marker signal corresponds to the marker signal shown by Bailey in U.S. Pat. No. 3,461,526. The marker pattern detected by detector 66 is not a member of any constrained symbol in the constrained set of symbols, therefore, will never send out a signal over line 67 when data is being processed.

Figure 10:
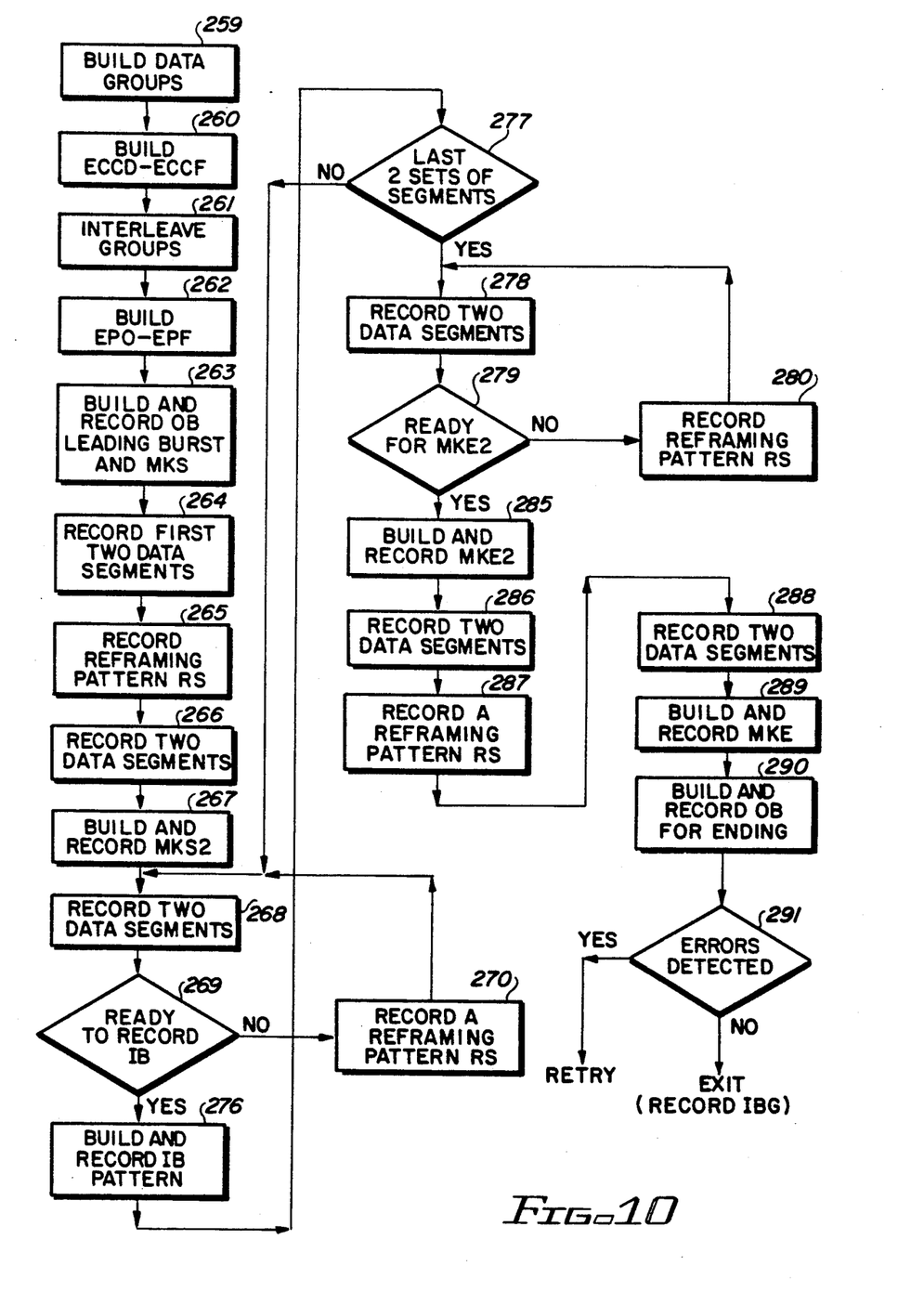
FIGS. 10, 11 and 12 are simplified machine-operation flowcharts showing operations of the invention.
Figures 11, 12:
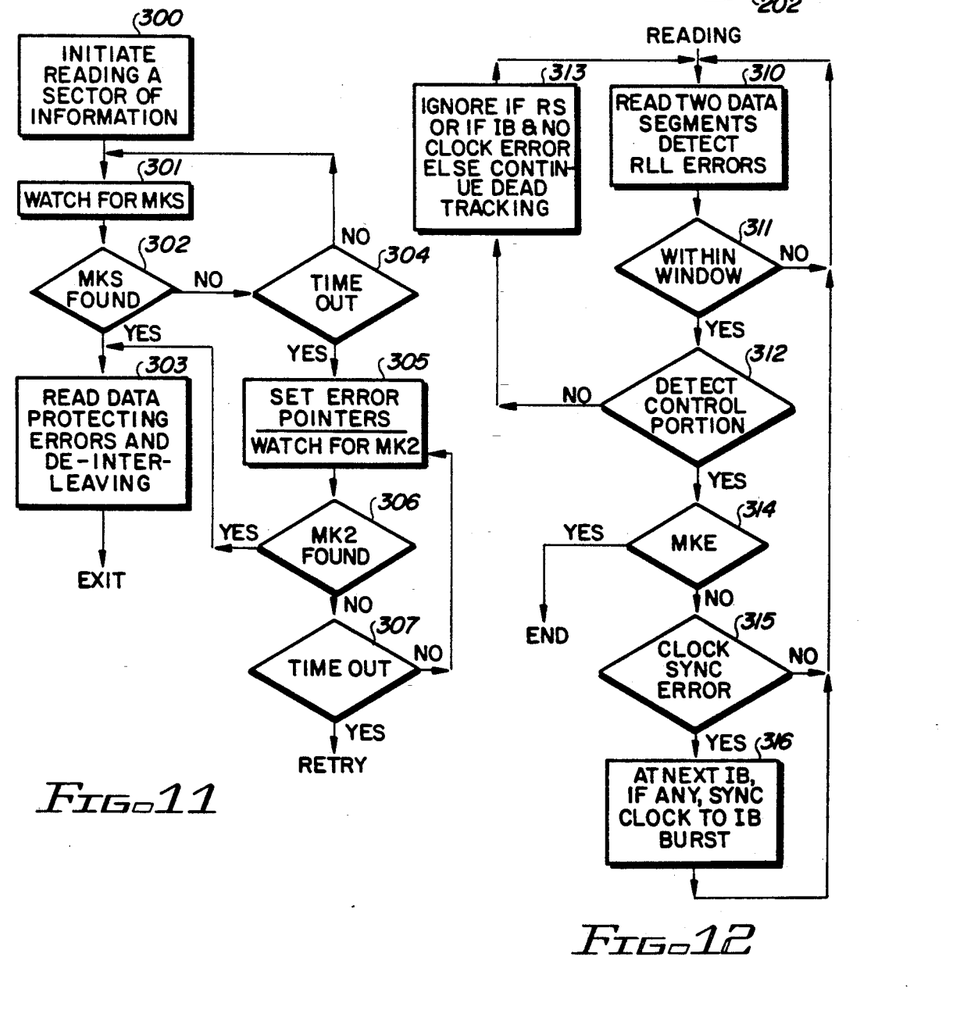

The loss of phase synchronization between data clock 32 and the readback signal is detected by error detect circuit 70. This detection occurs for each data portion 13; a loss of phase synchronization results in an error pointer to that data portion. When such loss is detected, all subsequent data portions 13 up to the next IB 16 are pointed to as being in error and data clock 32 is prevented from supplying data signals to shift register 33, i.e. the track is dead tracked until the next IB 16 is encountered whereat the synchronization is re-established, as is known. Operation of the illustrated circuits in all figures are controlled by state control 71. This control includes state control 70 receiving control signals from the various circuits. State control 70 corresponds to the control circuits found in tape and optical recorder systems, as is well known. What is shown herein is the change for practicing the present invention. The operation of state control 70, in this regard, is shown in FIGS. 10-12. The clock 32 loss of phase with respect to the readback signal detected by error detect circuit 70 is indicated by a phase error detected signal travelling over line 72 to state control 71. Control of error detect circuit 70 by state control 71 including line 73 for carrying a register clock timing signal circuit line 74 which carries the counter clock signals from state control circuit 71 to error detect circuit 70 and line 75 which carries a reset signal for resetting error detector circuit 70. State control 71 includes timing control of operations of all of the circuits in the recorder which type of control is well known in the art. Further, state control 71 memorizes any indications of whether data is being detected, whether the track is being dead tracked, whether resync is being encountered, whether data is being recorded or readback and the like. State control 71 also predicts the scanning of the control portions by read head 30. This action is achieved using known techniques, particularly as found in magnetic and optical disk recorders. Since the format is known, including the number of bit positions in each portion of the format, byte displacement from the beginning of a block of signals indicates the significance of the signals being read. That is, byte displacement from the beginning of the block predicts what is to be encountered by the read head. Since medium transport can have variations in speed, etc., the prediction is not precise. Accordingly, state control 71 generates a "window" in the form of a time slot in which the control portion will be looked for. Also the displacement indicates which control portion will be next encountered. For example, MKS 12 is the first encountered and is the first control portion to be examined, the first occurring reframing mark RS 14 is the second and will occur immediately after the known length of the first occurring data portion 13, etc. Such byte displacement is often generated or identified in disk recorders by rotational displacement; in tape recorders using flexible media, such media displacement is not reliable enough, hence the data clock 31 (FIG. 2) bit-indicating pulses are counted as a measure of byte displacement. Since these techniques are so well known, they are not further described herein.

The read circuits 31 digitize output signals as supplied over line 50 to burst detector 80, later detailed in FIG. 5, which supplies a burst-detected signal over line 82 to state control 71 for indicating that an all ones burst has been detected. Such ones burst is detected simply by measuring the elapsed time between successive signal transitions received from read circuits 31 and then counting such received signals. State control 71, when it receives the error signal over line 72, supplies a frequency lock error signal over line 49 for disabling data clock 32 for dead tracking the readback operation.

Figure 4:
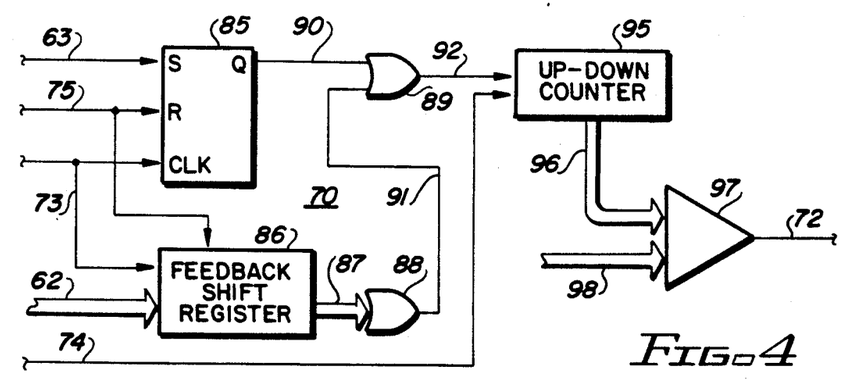
FIG. 4 is a simplified showing of the FIG. 3 error detection circuit for detecting loss of clock synchronization.
Figure 8:
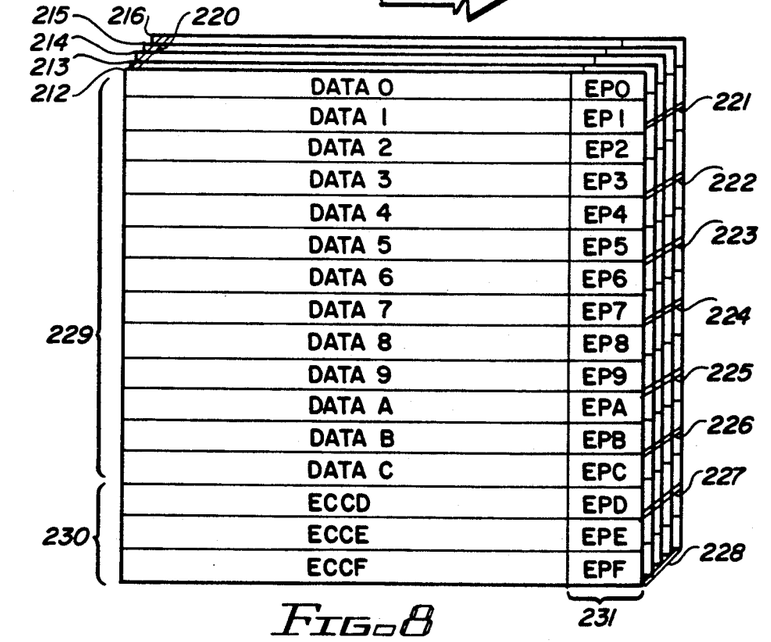
FIG. 8 is a diagrammatic showing of data recorded on the FIG. 1-illustrated magnetic tape, using an interleaved set of groups of data signals each separately error corrected and the placement of resynchronization signals for effecting the practice of the present invention.

Referring next to FIG. 4, error detect circuit 70 is described for showing detection of clock phase and frequency errors between data clock 32 and the readback signal. This circuit detects the loss of synchronization by detecting an error situation in a data segment, two data segments in each of the data portions 13, through the use of CRC error detection scheme. Referring momentarily to FIG. 8, a data segment is represented respectively by the symbols DATA0 through ECCF with the respective error detecting redundancy being denominated by the symbols EP0 through EPF. The description below for FIG. 4 relates to processing the readback signals of one data segment and its associated error detecting redundancy. When a predetermined number of data segments are in error, further data detection is aborted (the track is dead tracked) until the data clock 32 can be resynchronized to the readback signal at a control portion IB 16. One byte of data (9 bits) from decoder 61 travels over bus 62 to feedback shift register 86. Feedback shift registers 86 is preferably constructed in accordance with the principles involved with the Reed-Solomon error detection algorithms which use any one of a large plurality of generator polynomials, as is well known. Feedback shift register 86 is constructed such that one later-described segment (syndrome related) of data is error detected; that is, in a constructed embodiment, 32 bytes of data are transmitted into feedback shift register 86 followed by an error pointing redundancy, such as the cyclic redundancy check which, with no errors, make the contents of the feedback shift register 86 equal to zero, i.e., the calculated syndrome is zero. Feedback shift register 86 supplies its nine-bit calculated syndrome over bus 87 to logical OR circuit 88. If all of the signals on bus 87 are zero (syndrome=0) at the end of the segment of data and the error pointing redundancy, then the output of OR circuit 88 is a logical zero. When the calculated syndrome is zero, no active signal is supplied; any non-zero syndrome results in an active signal being supplied over line 91. A second error pointer signal is received from decoder 61 over line 63; that is, if decoder 61 finds an RLL symbol which is not within the defined constrained set of data recording symbols, that symbol is in error. This error signal on line 63 sets latch 85 to the "Q" or active condition. The line 73 timing signal from state control 71 is inputted to the clock input of latch 85 enabling the line 63 signal to be latched. If the signal is active at the clock time on line 74, then latch 85 outputs an active signal over line 90 to logic OR circuit 89. If on the other hand no RLL symbol violation is found, then latch 85 is not set and an inactive signal is maintained on line 90. In any event, logic OR circuit 89 passes either the active RLL error pointing signal or the error pointing signal on line 91 to updown counter 95. The counter clocking signal on line 74 times the operation of updown counter 95 for incrementing its internal count whenever the line 92 signal is active. The numerical contents of counter 95 are decremented by unity toward zero whenever the line 92 signal is inactive. In other words, the contents of updown counter 95 are either zero or positive for indicating the error state of the current readback operation. The modulus of counter 95 is preferably a reasonably large number such as sixteen. The numerical contents of updown counter 95 are supplied over bus 96 to digital comparator 97. When the numerical contents of updown counter 95 exceeds a numeric threshold supplied over bus 98, then the error situation is such that data being supplied to transducer 30 is no longer being reliably detected and therefore the track should be dead tracked, all as indicated by an active signal travelling over line 72 to state control 71. State control 71 passes that dead tracking signal over line 49 to stop the data-detection operation of data clock 32. Upon completion of processing a control portion symbol, state control 71 supplies a reset signal over line 75 for resetting the latch 85 for enabling detection of the next data symbol by decoder 61. The timing signal on line 73 is equivalent to a byte processed or symbol processed symbol as is widely used in tape recorders and disk recorders. The line 74 timing signal corresponds to the end of a segment of signals, i.e., at the end of a data portion 13. Of course, the byte related signal on line 73 is determined by counting the number of bits detected by read clock 32, i.e., 8 or 9 of bits in most data handling systems.

Figure 5:
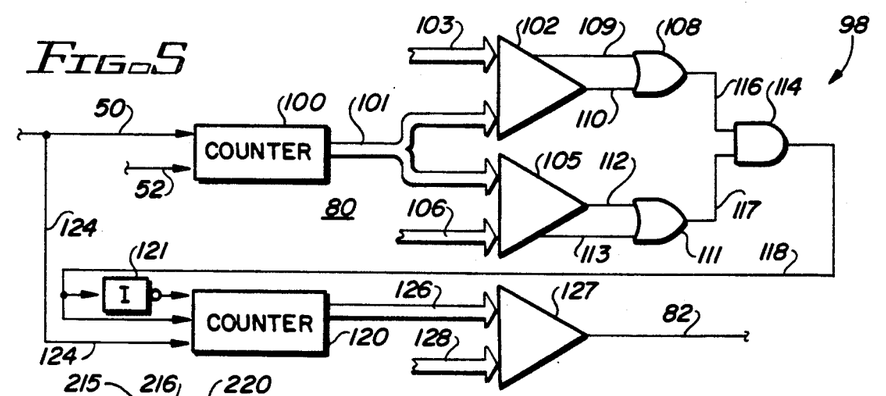
FIG. 5 is a simplified showing of the burst detector used in the FIG. 3 illustration.

Resync burst detector 80, as shown in FIG. 5, detects a series of consecutive one signals. A predetermined number, such as nine, of successive one signals with no intervening zero signals indicates a burst of one signals usable for synchronizing data clock 32. This detector detects the preamble and postamble bursts of signals in OB 11 and the signal bursts in any IB 16. The interblock gaps 22 may contain no binary one signals or may contain sufficient binary one signals to create a relatively low frequency readback signal, i.e., a signal consisting of binary ones separated by a number of binary zeros greater than that permitted in the d,k code used to represent data and as used in RS or other control symbols R1 through R7. A preferred repeated pattern is 10000000. Burst detector 80 supplies an inactive signal whenever an interblock gap 22 or any data or control symbol is being scanned—there are zero signals between binary one signals such that the above-mentioned predetermined number of binary one signals is not encountered. When a burst of successive one signals is being scanned, then burst detector 80 supplies a burst-detected signal over line 82. The end of the burst of binary one signals is indicated by a return of the signal on line 82 to the inactive state.

The above-described action is achieved by counting the time interval between successive data pulses (signal transitions or binary ones) with a crystal-controlled clock 51 that operates at a multiple of the nominal data frequency. Because of media velocity variations, the number of clock 51 pulses per bit period can vary from 10-20 percent for a single binary zero; between two successive ones, the clock pulse count from clock 51 doubles, therefore, the 10-20 percent variation is still easily discernable. Counter 100 counts the number of clock 51 signals received over line 52 between the signal transitions received over line 50 from read circuits 31; for a binary zero, no active signal occurs on line 50. The numerical contents of counter 100 are reset each time a pulse occurs on line 50, therefore, counter 100 begins its count from zero each time a binary one is received over line 52. The current contents of binary counter 100 are supplied over bus 101 to a pair of comparators 102 and 105, respectively, which perform the low and high threshold number comparisons. The low threshold number is a minimum number of clock 51 pulses between a succession of binary ones, while the high threshold is a maximal number of expected clock 51 pulses between a succession of binary one signals. Bus 103 carries the low threshold value to one input of digital comparator 102. Whenever the numerical contents of counter 100 are equal to or greater than the low threshold indicated by the signals on bus 103 then the signals are supplied respectively over lines 109 and 110 to logic OR circuit 108. In a similar manner, the high threshold is evaluated by the high threshold signals being supplied over bus 106 to one input of digital comparator circuit 105. Whenever the high threshold on bus 106 is greater than or equal to the signals on bus 101, a signal is respectively supplied over line 112 for equality and 113 for the count in counter 100 being less than the high threshold for passing through logic OR circuit 111. Lines 116 and 117 respectively couple OR circuits 108 and 111 to logic AND circuit 114. AND circuit 114 detects when the count in counter 100 is between the low threshold indicated on bus 103 and the high threshold indicated on bus 106. The line 50 pulse can be supplied as an additional input to AND circuit 114 for timing the comparison for the immediately preceding measurement period. AND circuit 114 supplies its comparison output over line 118 to a second counter 120 which counts the number of successive ones detected through the operation of AND circuit 114. The readback signal on line 50 travels over line 124 to trigger the operation of counter 120. Whenever AND circuit 114 supplies an active signal to counter 120 over line 118, the count is increased. Whenever the output of AND circuit 114 is inactive then inverter circuit 121 inverts same to an active signal to clear the numerical contents of counter 120. The active output from the inverter 121 indicates an intervening zero in the string of ones. The numerical contents of counter 120 are supplied over bus 126 to digital comparator 127 for detecting when a predetermined string of one signals have been received. The threshold (such as nine) for such string of signals is indicated over bus 128 to the comparator 127. Comparator 127 supplies its output signal over line 82 to state control 71. Whenever line 82 goes from an active to an inactive signal condition then the end of a burst is indicated by a signal on line 48 of FIG. 2.

FIG. 6 indicates the pattern recognition circuits used to identify the symbols in the control portions. Shift register 33 supplies its signals to an array of later-identified AND circuits which are multiplexed into a selection logic later described with respective FIG. 7 for identifying a detected control symbol, then indicating a detected symbol over line 41. Which pattern is to be detected is determined where in the format of FIG. 1 the read head 30 is currently scanning. State control 71 creates a detection window using known techniques and selects which symbol is to be detected based upon the area of the format being scanned. The output of the FIG. 6-illustrated circuits on line 41 is an active signal indicating that the desired control portion symbol has in fact been detected. For the reframing portions 14, a single byte in shift register 33 is used in the symbol detection while in the MKS, MKS2, MKE2 and MKE symbols all four shift register 33 portions are used. In the event of error recovery, fewer than four portions of shift register 33 may be used to overcome low quality readback problems. Such error recovery control is beyond the scope of the present disclosure. The purpose of FIG. 6-illustrated logic circuits is to effect character or pattern recognition. Each of the control symbols MKS, MKS2, MKE, MKE2, and IB is four bytes long, such that all portions 55–58 of shift register 33 contain bit patterns which are outside the run-length constraints for data-representing signals used in the recording system. As set forth above, eight special patterns are provided for symbol indication outside of the constrained set of symbols. The R1 pattern is detected by AND circuits 134 and 167; R2 is detected by AND circuit 148; R3 is detected by AND circuit 179; R4 is detected by AND circuits 132 and 182; R5 is detected by AND circuits 146 and 184; pattern R6 is detected by AND circuit 169; R7 is detected by AND circuit 133 while the data mark pattern RS is detected by AND circuits 147 and 164.

State control 71 selects the symbols to be detected by selectively actuating multiplexors MUX 130, 153, 160 and 175 using control lines 131, 154, 161 and 177. The abovedescribed signal patterns for MKS, MKS2, MKE2 and MKE indicate which of the multiplexors are used for the respective control portions as indicated above for the control symbols R1-R7, RS. For the control portions MKS12, MKS2 15, MKE2 20 and MKE21, the reframing symbol RS found in RS 14 control portions is detected via AND circuit 146 and MUX 153 in the forward read direction and by AND circuit 164 in the reverse or backward read direction. For detecting RS14 control portions AND circuit 142 is used for detecting the symbol indicating signals from byte portion 58 of shift register 33.

Figure 7:
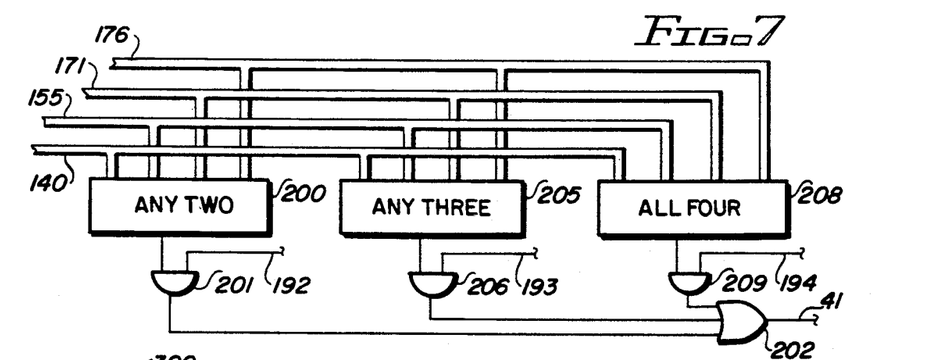
FIG. 7 is a simplified logic diagram of the selection logic for selecting the data indicating mark signal of the FIG. 6—illustrated selection logic.

The combination of the symbols R1–RS is selected by the set of multiplexers MUX 130, 153, 160 and 175. The selection of the patterns is by a set of control signals selecting one of the four inputs to the respective multiplexer circuits as represented by the control lines 131, 154, 161, and 177. In practice, the four control lines can be a two-line bus carrying four signal states, one for each of the inputs in the respective multiplexers. The special character decoding, as provided by the AND circuits above mentioned, include detection of the first byte in portion 58 by AND circuit 131 for the third input to multiplexer 130 as supplied over cable 138, the third and fourth inputs of multiplexer 130 as represented by buses 137 and 139 from AND circuit 133 and the first input as represented by bus 136 from AND circuit 134. In a similar manner, multiplexer 153 has its input selected from AND circuit 146 which receives the signals over bus 145 from second byte portion 57 of shift register 33. The output of AND circuit 146 travels over bus 151 to multiplexer 153 in its third input. AND circuit 147 passes the signals 145 over buses 150 and 152, respectively, to this second and fourth input to multiplexer 153, while AND circuit 148 passes its signal over bus 149 to the first input of multiplexer 153. In a similar manner, the third byte position 56 supplies its signal over bus 163 to three AND circuits next described. AND circuit 169 passes an active signal over bus 170 to the fourth input of multiplexer 160, AND circuit 167 passes an active signal over bus 168 to the second input while the third AND circuit 164 passes an active input over bus 165 to the first input and bus 166 to the third input of multiplexer 160, likewise, the fourth byte position of shift register 33 is fourth byte portion 55. Bus 178 carries the portion 55 signals to the three AND circuits next described. Then circuit 179 detects a pattern for supplying an active signal to the first input of multiplexer 175 over bus 180 and to the third input over bus 181, AND circuit 182 supplies an active signal over bus 183 to the second input of multiplexer 175 while AND circuit 184 supplies an active signal over bus 185 to the fourth input of multiplexer 175. Buses 140, 155, 171 and 176 respectively carry the output signals of multiplexers 130, 153, 160 and 175 to selection logic circuit 141 shown in more detail in FIG. 7. The mode of operation of selection logic circuit 141 is determined by the inputs on the control lines 192–194. An active signal on line 192 indicates that any two of the four patterns stored in the four-byte shift register 33 matching will provide an active signal over line 41, an active signal on line 33 requires three of the bytes in shift register 33 to be matched for an active signal while an active signal on line 194 indicates that all four bytes in shift register 33 must meet the pattern matching criteria of the abovedescribed AND circuits 132–184. It is to be understood that the selection of the patterns and pattern matching is implementation oriented by the selection of a run-length limited code which is a known design technique. FIG. 7 details the logic of circuit 141. The selections of using any two or any three sections of shift register 33 for detection includes detecting the RS pattern found in the reframing portions 14 and the portions IB 16. The all four selection is for detecting the above-described four-byte control portions. The any-two pattern match circuit 200 for the four bytes will include six AND circuits each having two inputs for comparing the outputs of the multiplexers as follows: 1 and 2, 1 and 3, 1 and 4, 2 and 3, 2 and 4, and 3 and 4. AND gate 201 receives a logic OR combination of the above-mentioned six AND circuits (not shown) for passing an active signal through logic OR circuit 202 to line 41. In a similar manner, any-three circuit 205 has four AND circuits each with three inputs for detecting three non-redundant symbol pattern combination from the multiplexers. The four AND circuits respectively receive inputs from the multiplexers 1, 2 and 3, 1, 2, and 4, 1, 3, and 4, 2, 3, and 4. The AND circuit passes the logic OR combination of those four AND circuits as gated by the line 193 signal to pass the detection signal to line 141 via OR circuit 202. In a similar manner, the all-four detection circuit 208 receives inputs from all four multiplexers to be gated by AND circuit 209 as enabled by the line 194 signal. The output of AND circuit 209 passes through OR circuit 202 to line 41. Numbers 1, 2, 3 and 4 respectively correspond to the first, second, third and fourth byte portions of shift register 33 and therefore identify the outputs of multiplexer 130 for position 1, multiplexer 153 for position 2, multiplexer 160 for position 3, and multiplexer 175 for position 4 of the shift register 33. The conceptual data arrangement for across-resync error detection and correction is shown in FIG. 8. The FIG. 8-illustrated array also represents the storage addresses for storing the data and the error pointing and error redundancies in buffer 43. The array represents the information for data in a form which is not run-length limited coded, i.e., for a data handling unit. Five independent error correcting (ECC) groups 212–216 are shown. Numeral 220 represents the preamble synchronization signals 11. None of the reframing portions 14 are shown in FIG. 8, the locations of such reframing portions in the data is set forth below. The preamble signals OB 11 immediately precede the first data portion 13 which consists of DATA0, EP0 of ECC groups 212 and 213, in that order. DATA0 and EP0 constitute the first syndrome segment of the respective ECC groups while DATA1 and EP1 constitute the second syndrome or data segments of the respective ECC groups. The first occurring reframing portion 14 is then inserted followed by the second data portion 13 which consists of the DATA0 and EP0 of ECC groups 214 and 215, in that order. Following the second data portion 13 is control portion MKS2. The third data portion 13 includes DATA0 and EP0 of ECC group 215 and DATA1 and EP1 of ECC group 212. The remainder of the illustrated data array is inserted into the format using the above-described algorithm of selecting two syndrome or data segments for recording in a respective one of the data portions 13. The last three syndrome segments ECCD, EPD; ECCE, EPE; and ECCF, EPF contain the error detecting and correcting redundancies for the respective ECC groups. Allocating the redundancy storing syndrome segments follows the allocation algorithm set forth above for the first syndrome segments.

While the preamble indication 220 is shown as extending across all five ECC groups, the record format finds the preamble recorded immediately adjacent only DATA0; the representation in FIG. 8 is to identify which of syndrome segments are recorded or reside between the preamble signals represented by symbol 216 and the first occurring IB 16 represented by symbol 221. All of the IB 16 representations 221-227 and the postamble OB 11 symbol 228 are representative of the clock resynchronization locations or boundaries with the actual recording of such signals being adjacent signals as best seen in FIG. 1. It is seen that the redundancies contained in the segments ECCD, ECCE and ECCF enable error correction over the plurality of synchronization patterns 221 through 227. The error pointers referred to above point to the data or syndrome segments in error enabling correcting three segments in error. In an optical disk, for example, the IB 16 control portions and the OB 11 control portions can be sector marks which include bursts of clock synchronizing signals.

The data portion of the error correcting arrays is represented collectively by numeral 229 for the data segments data zero through data C (hexadecimal). The error correcting redundancies are collectively represented by numeral 230 in the segments ECCD through ECCF; therefore, in each error correcting group, there are sixteen segments—three of which contain error correcting redundancies. The segment length is 32 bytes in a constructed embodiment. Additionally, the error pointing redundancies for each of the respective segments in the five groups or arrays 212-216 is collectively represented by numeral 231. EP0 through EPF are cyclic redundancy checked redundancies which act as error pointers by detecting errors in the respective segments data zero through ECCF. The last portion between resynchronization signal 227-228 contains nothing but error correction redundancies while one half of the portion between resynchronization signal 226-227 is error correction redundancies. The error correction redundancies extend throughout the ECC respective group across all of the resynchronization signals such that a dead tracking operation occurring, for example, between resynchronization signals 222 and 223 enables the correction of those signals by the redundancies stored in the portions between resynchronization signals 226 and 228 and all five ECC groups. Therefore, the interleaving of the groups within the portions between adjacent resynchronization signals and spanning the error correction redundancy calculations across the entire block which includes a plurality of resynchronization signals facilitates recovery of data caused by defects in the media as well as other problems such as debris on the medium surface. During readback, feedback shift register 86 of FIG. 4 calculates the error syndromes of each segment. During recording, the FIG. 4 feedback shift register generates EP0 through EPF, as is well known. In a similar manner, ECC circuit 44 calculates the ECC redundancies represented by numeral 230 as is known. Interleaving of error detection and correction entities is like interleaving any other data entities and therefore is well known and not explained further for that reason.

Figure 9:
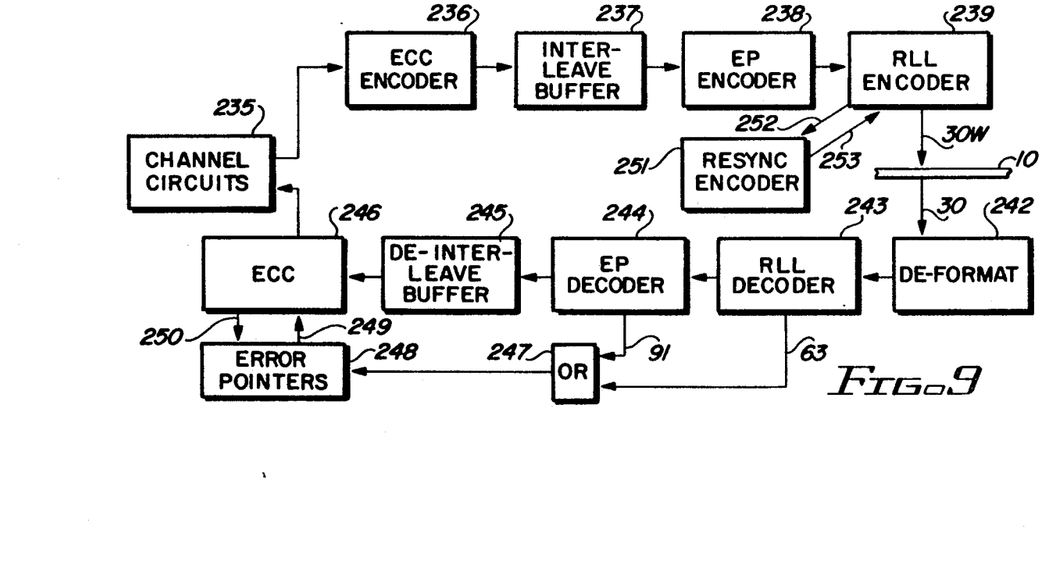
FIG. 9 is a simplified logic diagram of a recorder in which the present invention is advantageously embodied.

FIG. 9 is a simplified showing of logic and circuit blocks used in constructing a recorder player using the present invention. Typical channel circuits 235 connect the recorder to a host processor (not shown), such as a personal computer and the like. During the recording mode, the data received through channel circuits 235 are supplied on a byte-by-byte basis to ECC encoder 236, thence into interleave buffer 237. Interleave buffer 237 generates a set of data as illustrated in FIG. 8 wherein the five ECC groups 212-216 are stored in separate portions of the interleaved buffer the data storage arrangement being similar to that shown in FIG. 8. Once a set of data (including any padding bytes) is stored in interleave buffer 237, which is sufficient for recording a block of data, EP encoder 238 generates the EP0 to EPG redundancies represented by numeral 231. These redundancies are generated on the fly as the data is transferred from interleave buffer 237 to RLL encoder 239. RLL encoder 239 receives the synchronization and resync signals from resync encoder 251, as indicated by arrow 253. RLL encoder 239 requests the resync signals as indicated by arrow 252. The RLL encoded signals are supplied over line 30W, which represents a recording or writing transducer, for recording on magnetic tape 10. RLL encoder 239 preferably encodes a code such as a 0,3 code with a mapping of eight bits onto nine bits. The EP encoder 238 may use the detection code generator polynomial $G(X) = (X + T^1)$. The ECC encoder 236 may use a generator polynomial as $$G(X) = X^3 + T^{198}X1 + T^3$$

wherein the Galois field of elements is defined by polynomial $$X^8 + X^4 + X^3 + X^2 + 1$$

to generate the three error redundancies represented by numeral 230. Accordingly, there are three syndrome equations calculating error correcting syndromes which will change the signals in error as pointed to by the EP0 through EPG and the detected illegal RLL data symbols. The interleaved buffer addressing follows usual techniques for interleaving groups of data signals.

The recorded signals are read as indicated by arrow 30, which represents the reading transducer 30 of FIG. 2. The resynchronization signals are deleted in deformat circuit 242 with the other signals being passed to RLL decoder 243. Decoder 243, of course, corresponds to decoder 42 of FIG. 2 and 61 of FIG. 3. Based upon the decoder 243 operation, an error pointer can be supplied through OR circuit 247 via line 63. Next, EP decoder 244 uses the feedback shift register 86 (FIG. 4) for determining whether any error occurs in the segments DATA0 through ECCF as indicated by the error pointing redundancies represented by numeral 231. In the event an error in a syndrome's segment is detected, then a signal is supplied over line 91 to OR circuit 247, which corresponds to OR circuit 89 of FIG. 4. The pointers are then stored by error pointer circuit 248 in a predetermined address location such that the error pointers are logically associated with the respective syndrome segments (DATA0 through DATAC) shown in FIG. 8. ECC circuit 246 (corresponding to ECC 44 of FIG. 2) operates with error pointer circuit 248 by requesting pointers as indicated by arrow 250 and receiving the pointers as indicated by arrows 249. Insertion of error pointers, either code (internal) or others (external) is well known and not further described for that reason. Use of internal and external error pointers is shown by Hong et al., in U.S. Pat. No. 3,868,632; that is but one example. From EP decoder 244, the syndrome segments DATA0 through ECCF are passed and stored in deinterleave buffer 245 which has a complementary addressing scheme to interleave buffer 237. In a practical embodiment, both buffers may be the same electronic circuits with connections being programmably changed between recording and readback operations. The deinterleaved ECC groups 212-216 are then supplied to ECC circuits 246 for error detection and correction. The corrected data which is contained in the syndrom segments DATA0 through DATAC is then supplied to channel circuits 235 for relaying to a host processor or other data-using unit.

FIG. 10 illustrates the sequence of machine operations used in connection with the FIGS. 1, 8 and 9 illustrations for recording the FIG. 1-illustrated format onto a track of a record medium. It is assumed that a write or record command has been issued in the usual manner and that a host processor (not shown) has assembled the data (with any necessary padding to fill out all data portions 13 in one record block) ready to be recorded. In machine step 259, the data is segmented into the five groups, each group having DATA1 through DATAC segments, ready to create the five ECC groups 212-216. At machine step 261 the redundancies ECCD through ECCF are generated (built) as in ECC encoder 236. The FIG. 8-illustrated format is then generated in machine step 261 in interleave buffer 237. After interleaving, the machine step 262 generates the error detecting redundancies EP0 through EPF respectively for DATA0 through ECCF. It should be noted the machines steps 259 through 262 can be overlapped and occur in a different sequence, the illustrated steps indicating but one possible sequence. Note also that the buffer 237 operation is effected by storing the data into the buffer at addresses indicated by the FIG. 8 illustration.

Recording is now ready to ensue. At machine step 263, the preamble OB 11 is built and recorded. This step includes generating a gap 22 and then ending the gap 22 by the preamble OB 22, such as is currently practiced in tape recording. Following recording the preamble, the first data portion 13 is recorded at step 264, the first two data segments being DATA0 and EP0 of ECC groups 212 and 213. The next machine step 265 records an RS pattern as RS portion 14. This machine step is followed by machines step 266 to record two more data segments into the second data portion 13, namely data segments DATA0-EP0 of ECC groups 214 and 215. This recording is followed by machine step 267 building and recording control portion MKS2 15. Then at machine step 268 two more data segments DATA0-EP0 of ECC group 216 and DATA1-EP1 of ECC group 212. In the flowchart, the steps referring to recording two data segments imply that the data segments are the next two to be recorded as set forth herein to obtain a serial recording of the data block illustrated in FIG. 8. At step 269, it is determined whether or not IB 16 is ready to be recorded. Note that the recording requirement is determined by the byte displacement from the preamble or the beginning of the block. Viewing FIG. 8, it is seen that the first OB 16 is not to be recorded until the data segments DATA2-EP2 of ECC groups 215 and 216 have been recorded. These data segments are to be stored in the fifth data portion 13 in the data block. Accordingly, a counter (not shown) counting the data segments is usable to indicate when an IB 16 is to be recorded and when the control portions MKE2 20, MKE 21 and postamble OB 11 are to be recorded. Of course, the number of bytes recorded can be counted and that used for positioning the control portions on the record medium. A simple way to obtain byte count is to count the number of write pulses from a write timing clock (not shown but well known) and using the bit count (one bit per write clock pulse) to indicate byte displacement. In any event, ten data segments are to be recorded between the preamble and the first occurring IB 16, between successive IB 16s and between the last IB 16 and the postamble. After recording each data segment up to the ninth data segment, a reframing pattern RS 14 is recorded in machine step 270. Then a loop including steps 268 through 270 is repeated until the tenth data segment is recorded whereupon from machines step 269, machine step 276 is entered for building and recording an IB 16 control portion.

Following machine step 276, it is determined in machine step 277 whether the IB 16 that was just recorded is the last IB in the block, i.e., corresponding to symbol 227 in FIG. 8. If not, then step 268 is re-executed and the above-described machine operations repeat until the byte count indicates ECCE is the next syndrome segment to be recorded. Then, from machine step 277, two data segments are recorded in machine step 278 as a data portion 13 (not shown in FIG. 1). Then, at machine step 279, the byte displacement count is examined to ascertain whether the just-recorded two data segments are in the data portion 13 just preceding MKE2 20, if not, the recording is not ready for MKE2 requiring that a reframing pattern RS be recorded at machine step 280. From machine step 280 a loop is executed including machine steps 278 through 280. This loop is repeated until the recording is ready for MKE2 whereupon at machine step 285 MKE2 20 is built and recorded. Then at machine step 286 the next two data segments to be recorded (ECCF-EPF of ECC groups 213 and 214) are recorded. At machine step 287 the reframing pattern RS 14 is recorded followed by recording in step 288 the last two data segments to be recorded in this block (ECCF-EPF of ECC groups 215 and 216). Now the postamble is to be recorded in steps 289 and 290 respectively recording MKE and the trailing OB 11. Finally, at machine step 291 any errors detected during the recorded are evaluated for ascertaining whether or not the recording should be retried. Note that in the tape recording, read head 30 is displaced from a recording head 30W for reading the signals as recorded and supplying the readback signals for error checking as is known but using the read operations herein described. If the errors detected or no errors are detected, then the write operations are exited for performing operations usual to recorders that are not a part of the present invention. For example, any error in a control portion may be unacceptable but a predetermined small number of errors in the data segments may be permitted. The general algorithm used for reading a recorded block of signals is shown in the FIG. 11 flowchart of machine operations. At machine step 300 a sector of information (recorded block of signals) is initiated in a known manner. As the read head 30 scans the track over gap 22, the readback circuits look for the preamble burst. This detection is achieved by the FIG. 5-illustrated circuits. Once an OB 11 of the preamble is detected, then MKS 12 is watched for in machine step 301. This action occurs in the FIG. 6-illustrated circuits as above described. At machine step 302, a determination is made as to whether or not MKS has been detected. If not, a time out is incremented and measured in machine step 304. If the time out has not expired, then a loop of steps 301 through 304 until MKS is found as indicated by an active signal on line 41 or the time out has expired which indicates it was missed (the detection window has expired). If MKE is detected, then from machine step 302, the block is read in machine step 303. Machine step 303 is detailed in FIG. 12. If the time out expires, then in machine step 305 error pointers are set for all data segments recorded between MKS 12 and MKS2 15 as the beginning of data was not detected. Also in machine step 305, the FIG. 6-illustrated circuits are set to watch for MKS2 and data clock 32 is inhibited from supplying data signals. Note that the data clock 32 is probably still slaved to the readback signal as no indication by error detect circuit 70 would have indicated a loss of synchronization. If there is a loss of clock sync at this point, then the read is aborted. Then, at machine step 306, it is determined whether or not MKS2 is found (line 41 signal is active), if yes, then machine step 303 is entered. If MKS2 was not found, then a time out is measured and incremented in machine step 307. If there is a time out, then the block cannot be read and a retry will be instituted as is known in the art, such as a read backward to use MKE or MKE2 to find a beginning of data. If the time out has not expired, then a MKS2 search loop of machine steps 305, 306 and 307 is repeated.

FIG. 11 shows the reading machine operations in a simplified flowchart form. Firstly, at machine step 310, two data segments are read from the record medium. At machine step 311, it is determined whether or not a detection window has been set up for a control portion other than the reframing portions RS 14. Note that the reframing portion detection uses the FIG. 6-illustrated detector and a window is used for that detection. That repetitive operation is not detailed herein. Without a window, the reframing portion is scanned with step 310 repeated until a control window is generated as for processing an IB 16. For a window, signal processing continues plus the symbol detector of FIG. 6 is activated for detecting a multi-byte control portion. If the control portion is not detected (reading error has occurred) as indicated by machine step 312, then that failure is ignored and reading continues. Failure to read either a reframing portion 14 or a multi-byte control portion does not in and of itself indicate loss of clock sync to the readback signal which indicates reading could continue as the byte displacement count enables data detection, i.e., symbol boundaries are known. This action is indicated in step 313; however, if there is a clock sync loss, then dead tracking is continued. Of course, more than three syndrome segments are in error, then an uncorrectable read has occurred requiring aborting the current reading and attempting a retry. Such detection and retry are known and beyond the scope of the present description. When the control symbol has been detected, as indicated in machine step 312, then at machine step 314, it is determined whether or not the control portion is MKE 21. If not, then the control portion is MKE2 20 indicating that reading has not been completed. If the symbol is MKE, then the block reading is ended using known recorder operations. If the detected symbol is MKE2 or MKS 2, at least two more data portions 13 are yet to be read. From machine step 314, a clock sync error is checked at machine step 315. Without a clock sync error, step 310 is re-executed. If a clock sync error has been indicated at machine step 315, then dead tracking is continued at step 316 until the next IB 16 is encountered whereupon clock sync is re-established and step 310 re-executed.

Figure 13:
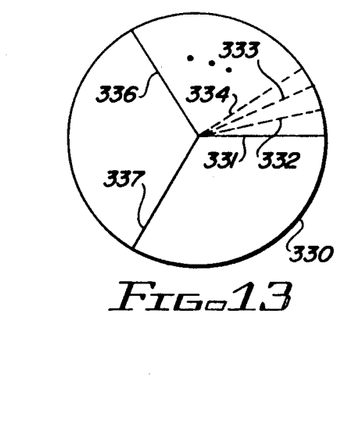
FIG. 13 illustrates an optical disk using the present invention.

FIG. 13 diagrammatically shows an optical disk in which the present invention is practiced using the FIG. 1-illustrated format in each of the tracks (not shown) on the disk. A sector mark 331 having a preamble synchronization embossed, etched or otherwise recorded extends radially of disk 330. Sector mark corresponds to the preamble OB 11 and MKS 12 of FIG. 1. Dashed lines 332-334 and the ellipsis (unnumbered) indicated the plurality of IB 16 control portions. Additional sector markers 336 and 337 enable a plurality of blocks of data to be stored one each track of disk 330; it is to be understood that in a practical embodiment that a relatively large number of sector marks may be employed.

While the invention has been particularly shown and described with reference to preferred embodiments thereof, it will be understood by those skilled in the art that various changes in form and details may be made therein without departing from the spirit and scope of the invention.

What is claimed is:

1. In a record member having a plurality of addressable record tracks, a set of data-representing machine-sensible indicia representing like-sized groups of data signals and error detecting redundancy data machine-sensible indicia, each group of data-representing machine-sensible indicia having said error detecting redundancy machine-sensible indicia disposed immediately adjacent to each other along the length of the track, respectively, the improvement comprising:

each track being arranged with the data-representing machine-sensible indicia being in one contiguous stream, a plurality of spaced apart error correcting syndrome boundary machine-sensible indicia interleaved in said one contiguous stream of data-representing machine-sensible indicia such that a like number of data-representing machine-sensible indicia are disposed between adjacent ones of the error correcting syndrome boundary machine-sensible indicia, error correcting syndrom boundary machine-sensible indicia respectively indicating error correcting syndrome boundaries in said data-representing machine-sensible indicia represented data for effecting error correction;

resync machine-sensible indicia including resynchronization machine-sensible indicia in said track and being interleaved between said groups of data-representing machine-sensible indicia such that a fixed number of said data machine-sensible indicia are disposed between adjacent ones of said groups of data-representing machine-sensible indicia; and error detecting redundancy machine-sensible indicia being disposed at a one of said error correcting syndrom boundary machine-sensible indicia such that the error detecting and correcting redundancy machine-sensible indicia are enabled to be used to correct predetermined data errors disposed on the track and being displaced from the error detecting and correcting machine-sensible indicia with intervening resynchronization signals.

2. In the record member set forth in claim 1, further including, in combination:

a plurality of evenly spaced-apart reframing machine-sensible indicia being disposed between adjacent ones of said syndrome boundary machine-sensible indicia.

3. In the record member set forth in claim 1, further including, in combination:

primary beginning and ending data-beginning marker signals respectively disposed at the longitudinal extremities of the data-representing machine-sensible indicia; and secondary data-beginning marker machine-sensible indicia disposed between predetermiend ones of the data-representing machine-sensible indicia in which the byte displacements between the secondary data-beginning marker machine-sensible indicia from the respective primary marker machine-sensible indicia are equal.

4. In a record member having a record track for storing information bearing signals as data-representing machine-sensible indicia, the improvement including, in combination:

a plurality of spaced-apart sets of data-representing machine-sensible indicia disposed in the record track in interleaved groups of said data-representing machine-sensible indicia;

each set of data-representing machine-sensible indicia further having like-sized ECC segments of signals for error correction by error correcting syndrom machine-sensible indicia;

each set of said data-representing machine-sensible indicia having an error detection redundancy machine-sensible indicia in each of said like-sized ECC segments, each said error detection redundancy machine-sensible indicia having a data pattern for detecting errors in the data-representing machine-sensible indicia of the respective segments in accordance with a first predetermiend generator polynomial whereby error pointers pointing to the data-representing machine-sensible indicia in error can be generated;

a plurality of said sets constituting a group of the data-representing machine-sensible indicia;

each of said groups of data-representing machine-sensible indicia having one or more error detecting and correcting redundancy error correcting and detecting machine-sensible indicia for the data-representing machine-sensible indicia of the respective groups, said error correcting and detecting machine-sensible indicia being generated by a second predetermined generator polynomial in which the data-representing machine-sensible indicia represented data are divided into a given predetermined number of rows for error detection and correction; and resync machine-sensible indicia interposed between said sets at every given predetermined number of the sets which given predetermined number is an integral multiple of said given predetermined number such that the error detecting and correcting redundancy machine-sensible indicia can be used to correct signals between any adjacent pair of said resync signals and wherein said error pointer signals recorded between said pair of resync signals can identify signals in error between any pair of resync signals.

5. The record member set forth in claim 4, wherein said record member is an elongated flexible magnetic strip which includes said record track.

* * * * *

UNITED STATES PATENT AND TRADEMARK OFFICE
CERTIFICATE OF CORRECTION

PATENT NO. :        5,172,381

DATED       :        December 15, 1992

INVENTOR(S) :     J. M. Karp, et al.

It is certified that error appears in the above-identified patent and that said Letters Patent is hereby corrected as shown below:

At column 1, line 31, the word "o" should be --on--.

At column 5, line 1, the words "between the IB 16" should be --between the IB 16s--.

At column 14, line 52, the equation "$G(X)=X^3+T^{198}X1+T^3$" should be --$G(X)=X^3+T^{198}X2+T^{198}X1+T^3$--.

At column 15, line 35, the word "syndrom" should be --syndrome--.

At column 18, line 66, the word "syndrom" should be --syndrome--.

At column 19, line 12, the word "syndrom" should be --syndrome--.

At column 19, line 34, the word "predetermiend" should be --predetermined--.

UNITED STATES PATENT AND TRADEMARK OFFICE
CERTIFICATE OF CORRECTION

PATENT NO. : 5,172,381

DATED : December 15, 1992

INVENTOR(S) : J. M. Karp, et al.

It is certified that error appears in the above-identified patent and that said Letters Patent is hereby corrected as shown below:

At column 20, line 5, the word "syndrom" should be --syndrome--.

At column 20, line 14, the word "predetermiend" should be --predetermined--.

Signed and Sealed this

Twelfth Day of April, 1994

BRUCE LEHMAN

*Commissioner of Patents and Trademarks*

*Attest:*

*Attesting Officer*